June 8, 1948. B. K. BEECHER 2,443,128
MANUFACTURE OF CRYSTALLINE ANHYDROUS ALKALI METAL ORTHO SILICATE
Filed July 24, 1944

INVENTOR
BRAZIER K. BEECHER
BY
William R. Day
ATTORNEY

Patented June 8, 1948

2,443,128

UNITED STATES PATENT OFFICE 2,443,128

MANUFACTURE OF CRYSTALLINE ANHYDROUS ALKALI METAL ORTHOSILICATE

Brazier K. Beecher, Wyandotte, Mich., assignor to Wyandotte Chemicals Corporation, a corporation of Michigan Application July 24, 1944, Serial No. 546,341

3 Claims. (Cl. 23—110)

The present invention relates to the manufacture of anhydrous crystalline alkali metal silicates, i. e., sodium, potassium or lithium orthosilicates, from molten caustic and either silica or the soluble alkali metal silicates. The ratio of $Me_2O:SiO_2$ (Me representing either Na, K or Li) in these soluble silicates used as a source of silica is less than that in sodium orthosilicate, i. e., less than 2:1. Such silicates which are reacted embrace the anhydrous silicates as glasses or powders, hydrous solids and the solutions. These alkali metal silicates and their preparations are described on pages 108–127 of Vail's "Soluble Silicates in Industry," #18 monograph series—1928 edition. Specific examples are sodium metasilicate $Na_2SiO_3$ and sodium disilicate $Na_2Si_2O_5$. My invention relates, moreover, to the manufacture of crystalline anhydrous orthosilicates of a white shade or substantially white, meaning having but a slightly green, gray or cream tinge.

The anhydrous orthosilicate to which I refer is the crystalline orthosilicate first described in the article by E. Jordis in Z. Anorg. Chem. 58, 98–101 (1908).

This crystalline orthosilicate is not to be confused with the so-called sodium orthosilicate or "subsilicates" which have been produced by the following three different methods:

(1) The wet digestion method wherein silica or water glass is digested with aqueous caustic alkali solution, illustrative of which is the British Patent #391,407 of 1933;

(2) The fusion of furnace process where an alkali salt, such as sodium carbonate, chloride or sulfate, is heated with silica to a temperature above the melting point of the reaction product; and (3) The dry process wherein caustic alkali and silica are mixed together, subjected to a temperature below the melting point of the caustic, illustrative of which are the Beecher U. S. Patent #2,219,646 and the Soderburg U. S. Patent #2,211,733.

The commercial products from these respective above-outlined processes, where in the solid form the ratio of the reacting ingredients has been in the proportion of two mols of alkali oxide to one mol of silica are in reality meta silicates plus a surplus of alkali, e. g., $Na_2SiO_3+NaOH$.

Figure 1:
Fig. 1 is a photograph of two separate X-ray diffraction patterns.

In Fig. 1 the numeral 2 represents the X-ray diffraction pattern of crystals of anhydrous sodium orthosilicate made by applicant's process. The numeral 1 represents the X-ray diffraction pattern of a commercial product, referred to in commercial channels as sodium orthosilicate and which was made by a process referred to supra as (3) type. By comparison of these respective patterns it will be seen that the lines characterizing 2 do not appear in 1; the latter exhibits the lines which appear in photographs of the X-ray diffraction pattern of a mixture of sodium hydroxide and anhydrous sodium metasilicate.

Accordingly the conditions for the formation of sodium orthosilicate as disclosed in the Jordis article referred to herein would be entirely impractical from a commercial standpoint. It is clear from a study of the Jordis procedure that the fusion of silica with caustic soda was conducted with laboratory grade pure caustic and in a silver crucible without stirring. No agitation or agitation only for the duration of the dispersion of the ground silica into the molten caustic tends to yield a slurry which is so non-uniform and furnishes so few crystals of a large size that the slurry cannot be satisfactorily handled.

Commercial manufacture in quantity of sodium orthosilicate is obviously limited to the use of technical grade caustic soda and to the use of vessels of gray or cast iron, such as employed in the dehydration of aqueous caustic soda. While theoretically vessels constructed of the noble metals might be used to avoid contaminations of the caustic soda melt, such vessels have proven to be neither sufficiently durable for economical use, nor do they prevent contamination of the caustic.

My present invention relates to a process, operable upon a commercial tonnage scale, wherein the alkali metal orthosilicates of anhydrous crystalline character are formed by reacting commercial caustic soda or potash in a molten condition with either silica or the soluble alkali metal silicates and driving off the water of reaction, thereby precipitating the orthosilicates in a white or substantially white condition. To secure such superior grade crystals it is necessary that caustic soda in the so termed "green state" (i. e., of a greenish color) be used. Caustic in this condition is well-known to the worker on the finishing pots in the manufacture of caustic soda, who, however, adds sulphur before cooling to eliminate this color—page 295 of "Manufacture of Soda," by T. P. Hou (A. C. S. monograph series #65, 2d edition). The molten "green" caustic may be obtained either by transferring from a pot of the molten material or by melting the "green" solidified caustic.

It is essential that the molten caustic be in the "green state" before and during the formation of sodium orthosilicate, in order that the iron picked up by the caustic from the walls of the vessel be kept in soluble form. On the other hand when caustic is in the white or shaded state the iron picked up from the iron vessel during the course of the reaction occurs in the form of a reddish brown precipitate which is occluded by the orthosilicate crystals during precipitation with the result that the crystals are of a brown color and contain iron in excess of 100 parts $Fe_2O_3$ per million. Upon prolonged standing in the pot the initially green molten caustic will ultimately become reddish brown in color and turbid. However, precipitation of sodium orthosilicate from an entire run of a full charge of the caustic can be completed and removed from the vessel long before the iron precipitates.

While it is preferred to add the silica or the alkali metal silicate in the anhydrous condition to anhydrous molten caustic, the silica or the silicate can be added with water or the caustic may contain water or both, provided not only the water of reaction, but also the accompanying water is substantially removed. There is a very fine precipitate formed in the initial stages, and as the dehydration proceeds granular alkali metal orthosilicate becomes distinct in the molten caustic which becomes clearer and freer of water. It will be understood that the caustic is in excess over the theoretical amount required to combine with the silica or silicate according to the reaction of this process, which is represented in the case of silica by the following equation: $-4NaOH + SiO_2 \rightarrow Na_4SiO_4 + 2H_2O$. Water is expelled by the temperature at which the molten caustic is maintained and this occurs not only when the silica encounters the molten caustic, but during the gradual expulsion of water of reaction. When the find precipitate has become granular and rapidly settles out, there is no or substantially no water present in the molten caustic alkali.

In order to secure crystals of sodium orthosilicate which are uniformly large, it is important that the pulverized silica should be added at spaced intervals. The intervals between additions should be spaced so that time is allowed both for the evolution of water vapor and the formation of crystals of sufficient size that they settle rapidly and substantially completely. After the evolution of water vapors a very finely divided precipitate can be noticed in the pot. For securing larger size crystals, say 10 mesh, and in a short space of time, agitation is continued until these small particles have grown sufficiently in size to become granular. At this time another addition of pulverized silica is added and agitation continued until the same phenomena are observed. A convenient test is to remove a small ladle (about ½ pint capacity) mixture from the pot and note the time required for the aforesaid settling. I have found that a serviceable guide to follow is that the crystals should settle in this ladle in approximately 10 seconds by visual inspection. This addition of silica or silicates, expelling of water of reaction and stirring to condition the crystals is repeated, until the desired amount of silica has been added.

No precise time limit for the intervals between the addition of silica can be given as this depends upon many factors. The higher the temperature, the more rapid is the disappearance of the opaque, finely divided precipitate and the formation of the discrete crystals. The greater the degree of agitation the shorter is the interval between additions. The smaller the fraction of the total silica added, the shorter is the time between additions. In all events the important criterion is the substantial disappearance of the very fine, readily suspended particles initially formed upon the addition of the silica before the addition of succeeding batches of silica. The effect of my method of operation, therefore, is to pass repeatedly through the crystallization step, while limiting the number of nuclei for the crystal growth during each successive addition, in order that the desired size of crystals may be obtained. There is, of course, water present when the small solid particles are first formed, but this is substantially removed by the time the discrete crystals appear.

The size of the individual additions may be varied over wide limits. I prefer to make the additions in units of about 15% of the total silica to be added. These units can be much larger, such as 25%, in which case more time must be allowed between additions and smaller crystals can be expected. On the other hand, the individual additions can be much smaller with less time between additions.

The total amount of silica to be added to a given amount of caustic may be varied over a wide range, depending on the physical characteristics of the finished slurry that is desired. By reference to the equation representing the reaction $SiO_2 + 4NaOH \rightarrow Na_4SiO_4 + 2H_2O$ it can be seen that theoretically 70 pounds of silica will react with 187 pounds of caustic soda to form 214 pounds of sodium orthosilicate crystals, but since the sodium orthosilicate is slightly soluble in excess caustic soda, the actual yield when such excess is present, is found to be 208 pounds. Hence, when employing 450 pounds of molten caustic as disclosed in the example below, 263 pounds of molten caustic will be left in which the said crystals are suspended. The water formed by the reaction is driven off during the course of the reaction. This mixture of 208 pounds of the distinct crystals and 263 pounds of caustic forms a very heavy crystalline suspension, whose physical nature facilitates easy separation in a centrifuge or other separating devices. Obviously, slurries of higher solid contents as well as slurries of lower solid contents can be prepared, depending upon the desired handling characteristics of the slurry.

It is believed that the molten caustic is anhydrous by the time the granular crystals settle, as indicated. No fine bubbles can be discerned in the mother liquor. But inasmuch as the determination of water from a chemical analytical point of view by present known methods is practically impossible, applicant cannot say positively that there is no water present.

The effect of higher temperatures is to increase the rate of the disappearance of the initial precipitate formed on adding silica to molten caustic. This is also accompanied by a rise in the rate of iron pick-up from the vessel. For this reason I prefer to stay below 900° F. At the other end of the range, while the iron pick-up rate is low, the rate of recrystallization of the precipitate formed is extremely slow and, therefore, I prefer to operate above 750° F. My preferred temperature is 800°, which I find close to being an optimum for the two opposing effects mentioned.

Variations of my operating procedure are readily apparent to anyone skilled in the art. For example, a single batch of sodium orthosilicate may be grown in a given quantity of caustic soda, the mother liquor of caustic soda after the crystals have been removed being diverted to some other purpose and a fresh batch of caustic taken. Alternately, the mother liquor can be returned to a reaction vessel, the depletion of caustic due to formation of sodium orthosilicate made up by the introduction of fresh caustic soda and another crystallization performed. In another modification, a series of iron vessels may be used, the first one using fresh caustic soda as the starting material, the second one receiving the mother liquor from the operation in the first vessel plus fresh caustic, the third one receiving the mother liquor from the operation in the second vessel, and so on. By this means crystals of varying degrees of purity and whiteness could be obtained as each succeeding vessel would have a larger amount of iron and other impurities. In still another modification the mother liquor from any crystallization can be run to a suitable vessel for settling while in the molten state to separate any precipitated iron or other impurities that may have been picked up, the clear liquor then being converted to the "green state" by proper heating or oxidation and returned to the crystallization vessel.

It is preferred to use silica in a very finely divided state and of a high purity, such as a 200 mesh silica flour made from glass sand. Particles of silica of this size dissolve almost instantaneously in the molten caustic. High grade silica does not add appreciable impurities to the melt. However, much coarser silica can be employed up to and including coarse sand, the only effect being that the rate of solution will be considerably slower and more time must be allotted for the completion of the reaction.

A continuous mode of operation can be employed if the choice is made to sacrifice uniformity of crystals. By such a mode silica can be added continuously or in very small increments to the molten caustic, preferably anhydrous caustic, in a vessel provided with an agitator, the slurry continuously withdrawn, the crystals centrifuged or otherwise separated from the mother liquor; the mother liquor thereupon returned to the said vessel together with fresh caustic in an amount sufficient to make up for the depletion. The crystals exhibit a wide range of sizes, from relatively coarse to extremely fine. However, for some purposes such a range of crystal sizes may be satisfactory and some classifications of the crystals accomplished by using a centrifuge of the solid bowl type. By such an expediency the finer crystals would remain in the mother liquor and be returned to the original vessel.

In order that the invention may be more clearly understood and readily carried into effect, a method of operation in accordance therewith will now be described in somewhat greater detail.

The following example serves to illustrate the invention. It is given purely by way of an example in a somewhat greater detail than the description supra and without limiting the scope of my invention to the specific details set forth therein.

Example 1450 pounds of molten caustic from a finishing pot in the manufacture of caustic soda and accordingly in the "green state," or of a green color were added to an iron pot fitted with an agitator. The caustic soda was initially at 820° F. After addition to the cold small pot, the temperature of the molten caustic was brought to 800° F. by means of a burner and the melt maintained at 800° F. throughout the entire run. The agitator was started and 8.8 pounds of silica flour added. This silica reacted with the caustic soda, with the evolution of water vapor and a very finely divided precipitate could be noticed in the pot. Agitation was continued until these small particles had grown sufficiently in size to become granular. Test samples of the agitated mixture were removed from time to time from the pot by means of a small ladle, and observation made thereon of the time required for the particles to settle substantially completely. When the particles had become large enough to settle in approximately 10 seconds, another addition of 8.8 pounds of silica was then made, and agitation continued until the settling test again indicated the particles settled in 10 seconds. This was continued until 70.4 pounds of silica flour had been added. The intervals between additions varied from 40 to 80 minutes under the conditions of agitation and temperature above set out. The total time from the initial addition of silica to the completion of the reaction was 8 hours. At the end of this time the pot contained a very heavy slurry of 208 pounds of large crystals of sodium orthosilicate up to about 10 mesh in size. These crystals were readily separated in a centrifuge from the mother liquor of molten caustic. They were of a substantially white color and contained less than 100 parts $Fe_2O_3$ per million.

Figure 2:
Fig. 2 represents a photomicrograph of the anhydrous crystalline sodium orthosilicate of my invention at 25 diameters magnification.
Figure 3:
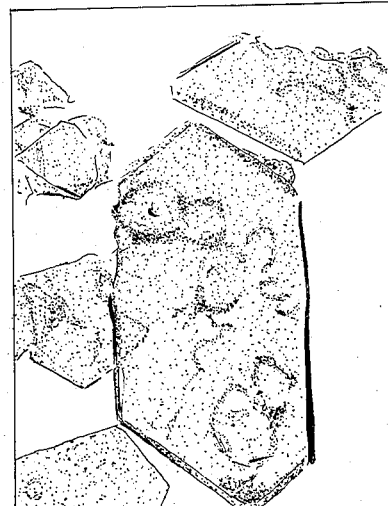
Fig. 3 is a view similar to Fig. 2 but at 65 diameters magnification.

The crystals analyzed 63.2% $Na_2O$ and 31.1% $SiO_2$; this calculates to a molar ratio of $Na_2O:SiO_2$ of 2.15. This compares with a ratio for $Na_4SiO_4$ of 2. The difference in the ratios is accounted for by the slight amount of caustic soda adhering to the crystals. As seen from Figures 2 and 3, the sodium orthosilicate product of this example is of a definite crystalline structure and in the hexagonal form; the particles are glass clear under the microscope and white to the naked eye. The comparison of the X-ray crystal pattern thereof, represented in Figure 1, with that of the dry process "so-called" sodium orthosilicate represented in this figure discloses that the two are not identical.

Other modes of applying the principle of my invention may be employed instead of the one explained, change being made as regards to the means and the steps herein disclosed, provided the steps are within the scope of the following claims.

I claim as my invention:

1. In the method of making crystalline anhydrous alkali metal orthosilicate in which the mol ratio of alkali metal oxide (ME₂O) to $SiO_2$ is 2 to 1, the steps of reacting a quantity of a member of the group consisting of silica and the soluble silicates whose ratio of $ME_2O:SiO_2$ is less than that of the orthosilicate in a body of molten caustic alkali in contact with iron and at a temperature between 700° F. and 900° F., expelling the water of reaction, precipitating out of said body of mother liquor fine particles which become transformed into granular crystals, adding an additional quantity of such reactant to said body of molten caustic alkali and maintaining the said heat range, expelling the additional water of reaction and precipitating out additional fine particles, then repeating said addition of more of such reactant with expulsion of water at least once more, the quantity of said body being sufficiently great to maintain the presence of a caustic alkali mother liquor after the addition of all the siliceous reactant and after the completion of the reaction, then mechanically separating the granular crystals in the substantially anhydrous slurry from the caustic alkali mother liquor.

2. In the method of making crystalline anhydrous sodium orthosilicate in which the mol ratio of $Na_2O$ to $SiO_2$ is 2 to 1, the steps of intermittently introducing a member of the group consisting of silica and the soluble sodium silicates whose $Na_2O:SiO_2$ ratio is less than in sodium orthosilicate in a pulverized condition into a body of molten caustic soda in contact with iron and maintained at a temperature of 750° F. to 900° F. and in a condition termed the "green state," the quantity of said body being sufficiently great to maintain the presence of a caustic alkali mother liquor after the addition of all the siliceous reactant and after the completion of the reaction, expelling the water of reaction resulting from each increment of siliceous material, precipitating fine particles of sodium orthosilicate out of said body of mother liquor, agitating to cause the fine particles formed to stay in suspension and become granular before the next respective addition, the total amount of additive reactant being sufficient only to form a slurry of the sodium orthosilicate crystals, and then mechanically separating said crystals from the molten caustic soda mother liquor.

3. In the method of making crystalline anhydrous sodium orthosilicate in which the mol ratio of $Na_2O$ to $SiO_2$ is 2 to 1, the steps of introducing silica in a pulverized and anhydrous condition into a body of molten substantially anhydrous caustic soda, said caustic soda being in contact with iron and maintained at a temperature range of 750° F. to 900° F. and in a condition termed the "green state," the silica being introduced at interspersed intervals in aliquot portions of substantially 15-25% of the total amount added, the quantity of said body being sufficiently great to maintain the presence of a caustic soda mother liquor after the addition of all the silica and after the completion of the reaction, expelling the water of reaction from each increment, precipitating out fine particles of sodium orthosilicate from said body of mother liquor, agitating for a period of time between substantially 40-80 minutes between additions to cause the fine particles formed after said additions to remain in suspension and become granular before the next addition, the total amount of silica adding being sufficient only to form a slurry of the sodium orthosilicate, and then mechanically separating the said crystals from the molten caustic soda mother liquor.

BRAZIER K. BEECHER.

REFERENCES CITED

The following references are of record in the file of this patent:

UNITED STATES PATENTS

| Number | Name | Date |
|---|---|---|
| 2,142,265 | Diekmann | Jan. 3, 1935 |

FOREIGN PATENTS

| Number | Country | Date |
|---|---|---|
| 484,547 | Great Britain | May 6, 1938 |

OTHER REFERENCES

Mellor, "Inorganic and Theoretical Chemistry," vol. 6, page 332. Pub. by Longmans, Green and Co., London (1925).

Hou, "Manufacture of Soda," A. C. S. Monograph 65, pages 110, 206. Pub. by Chemical Catalog Co., New York (1933).

Hackh's Chemical Dictionary, third edition, page 389. Pub. by the Blakiston Co., Philadelphia (1944).